Sept. 12, 1933.   R. M. GALLOWAY   1,926,869
HYDRAULIC POWER REGULATING MEANS
Filed Jan. 4, 1928   5 Sheets-Sheet 2
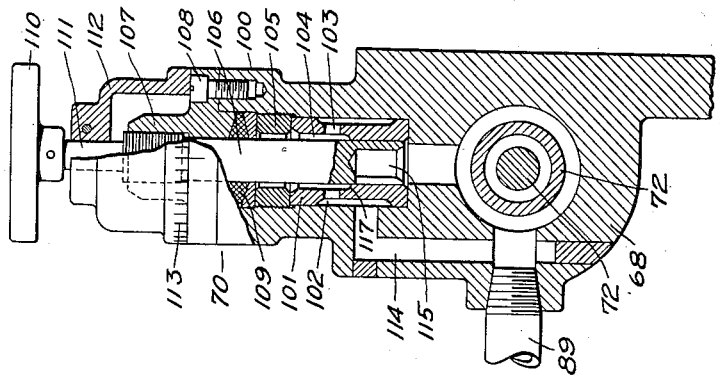
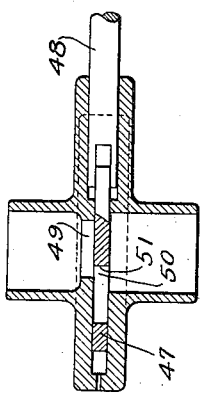
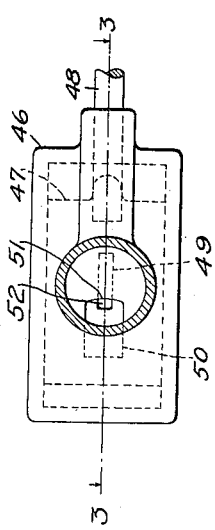
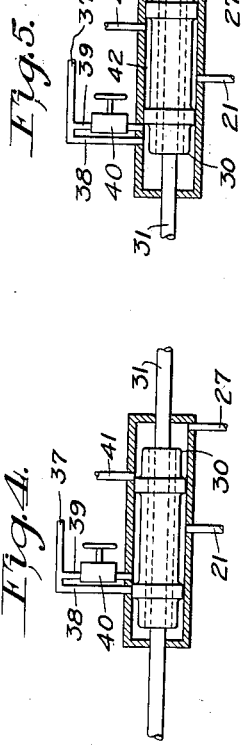
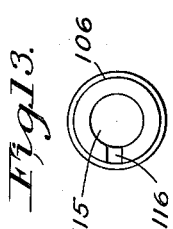
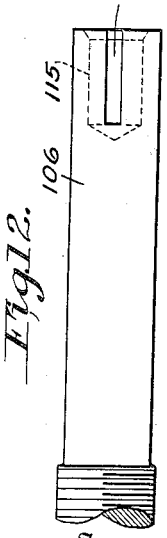
Inventor
Robert M. Galloway
By Attorneys
Nathan & Bowman

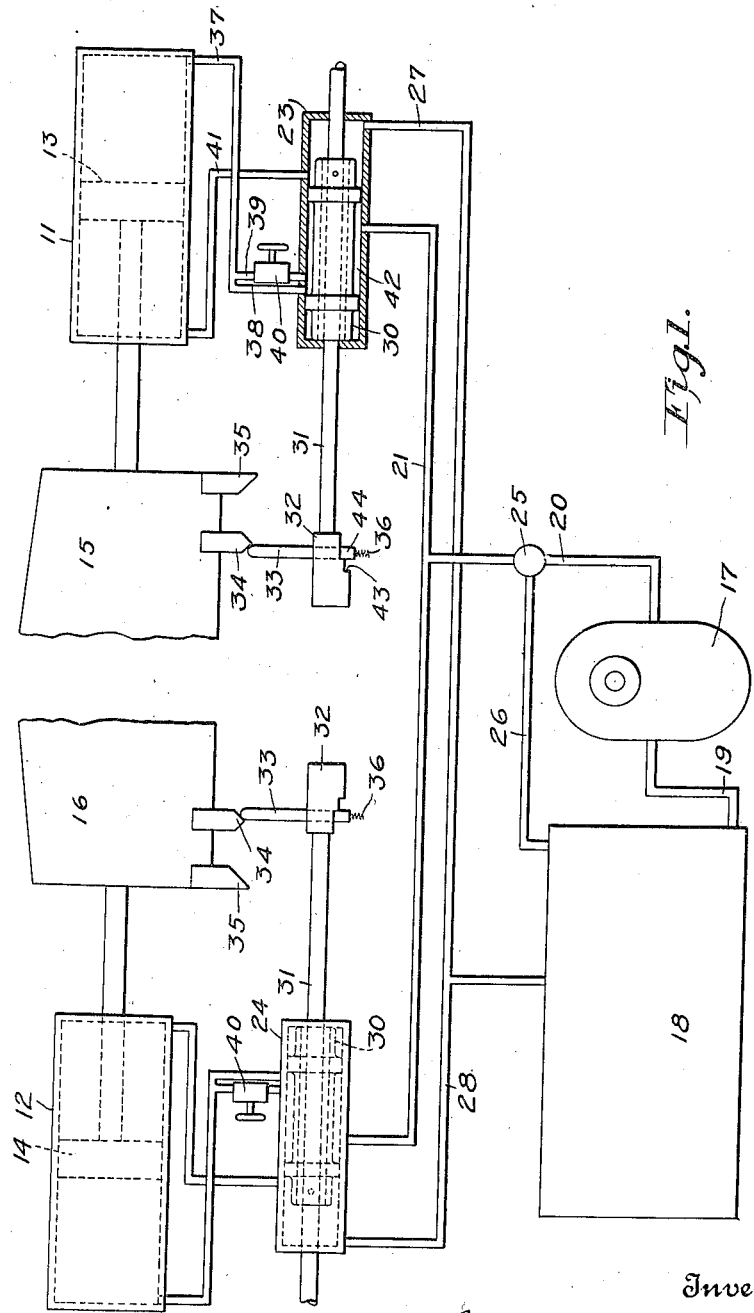

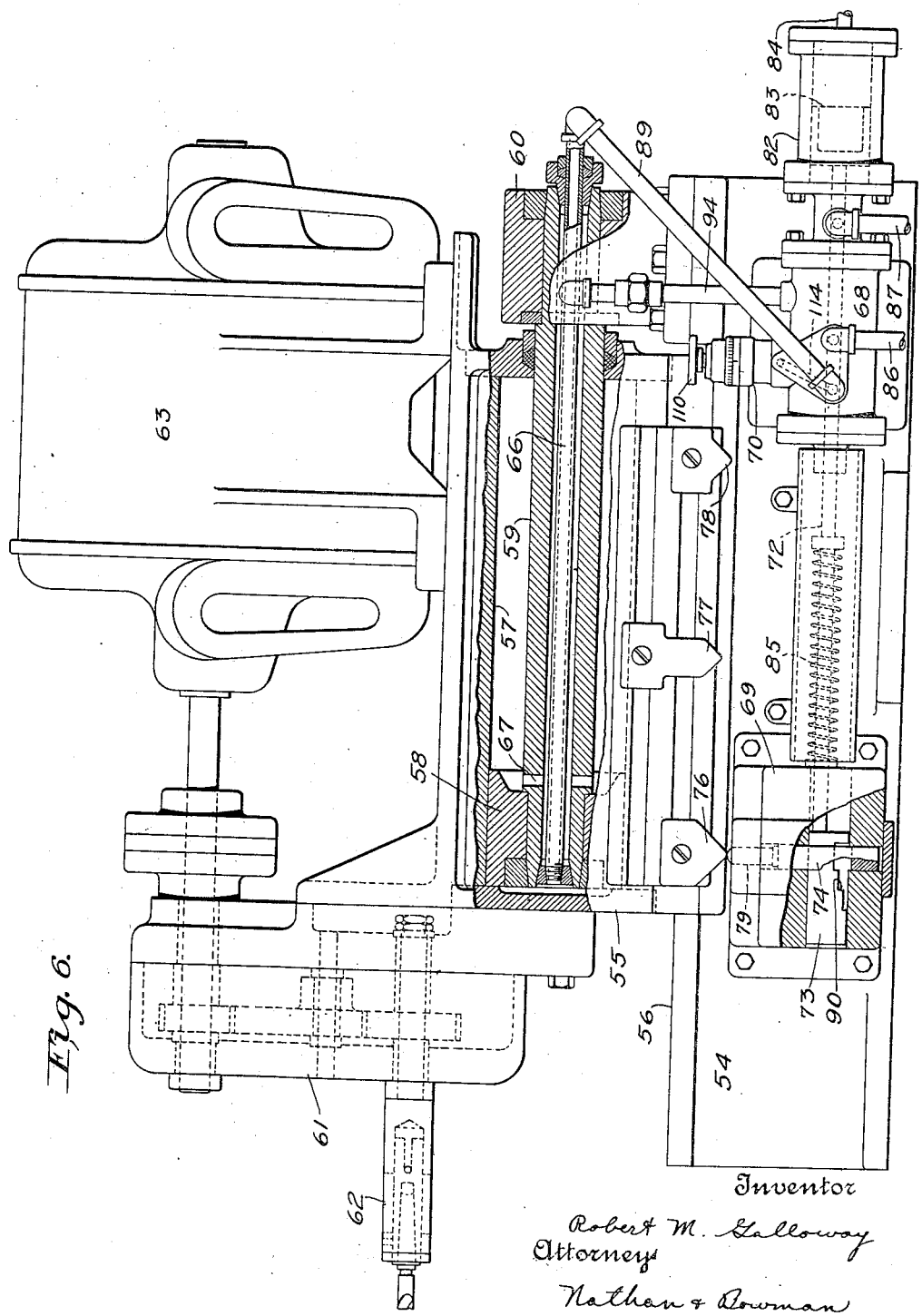

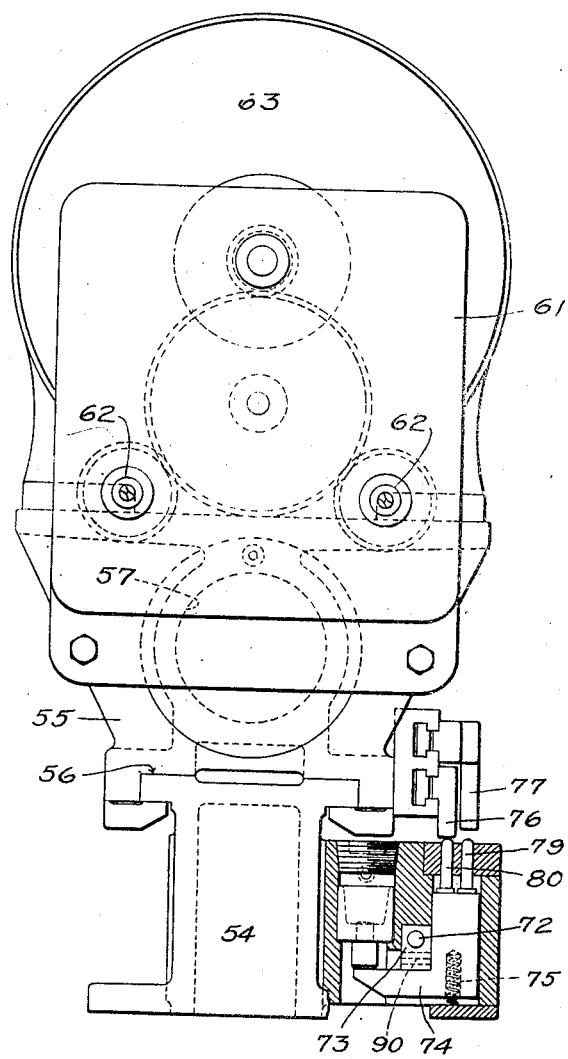

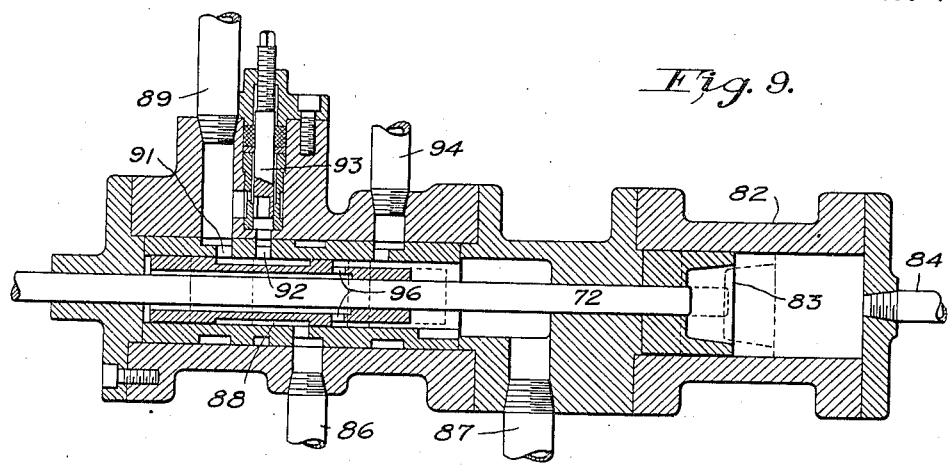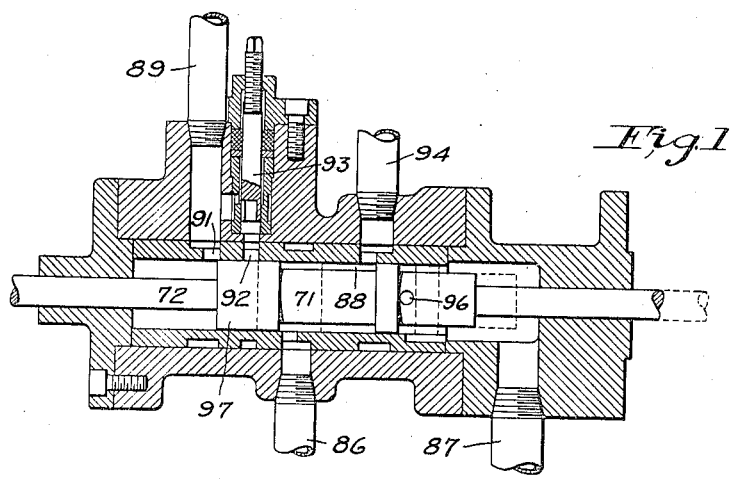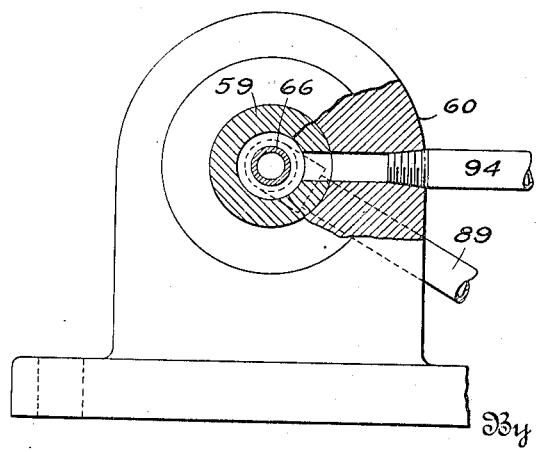

Patented Sept. 12, 1933

1,926,869

UNITED STATES PATENT OFFICE 1,926,869

HYDRAULIC POWER REGULATING MEANS

Robert M. Galloway, Richmond, Ind., assignor to The National Automatic Tool Company, Richmond, Ind., a corporation of Indiana Application January 4, 1928. Serial No. 244,421

4 Claims. (Cl. 121—45)

This invention relates to improvements in hydraulic propulsion systems for machine tools, and specifically a means for remedying the unsteady and unreliable operation of systems heretofore employed or proposed. It involves a coordination and combination of elements including, as a primary feature, a specific type of adjustable regulating valve operative to determine the speed of advancement of the work-piece and the cutting tool relative to each other during the crucial period or event in the cycle commonly known as the slow working feed. The efficiency of the machine tool; the quality of the finished surfaces including the adherence to the desired size; and the life of the cutting tool, it will be readily understood, are all dependent to an exceptionally major degree upon the manner in which this relative feeding is accomplished during the specific period in which the forming operation occurs.

In accordance with the arrangement proposed, the operative hydraulic fluid during the slow working feed is directed through an adjustable regulating valve. A typical cycle of the machine tool includes e. g. a rapid advance of the cutting tool head and the work-piece head relative to each other to a point where the tool and work-piece engage, or are about to engage; a slow working feed during which time the cutting operation is performed; and a rapid reverse movement back to the original position where the heads may come to rest, or proceed on a repetition of the cycle.

The particularly important feature of the invention herein disclosed comprises the provision in such a combination of a regulating valve which is entirely free from clogging and the exceedingly injurious effects resulting therefrom. Irrespective of how closely screened a hydraulic fluid may be, it has been discovered that there inevitably will be entrained therein a certain amount of fine sediment or lint which has a decided tendency to lodge in any narrow crevices. A further characteristic discovered in this connection is that of, once an initially small particle or quantity of such foreign matter has lodged in some region of a valve opening, the gradual building up, through accretion, of a larger barrier. This may continue, accompanied by a corresponding reduction of the effective valve opening, until the pressure created by the flow breaks the barrier completely away, with the result that the machine tool head suddenly spurts forward.

Following these discoveries and in accordance with the present invention a regulating valve has been provided in the hydraulic system the flow opening of which is of such shape and dimensions as to be free from any narrow regions which are susceptible to, or which encourage the collection of foreign matter therein. As exemplified by the specific regulating valve shown herein the arrangement is such that for even the minimum of opening which might be required in any practical operation of the machine tool the exposed opening does not contain any narrow regions such as would be presented e. g. by the plug type of valve which is movable into engagement with or toward a circular seat leaving an annular opening which would be decidedly narrow throughout its extent; or any of the other well known types of valves in which for a small flow the opening would consist of a long narrow slit, or at least terminating in a slender region. The specific type of valve illustrated herein also, it will be seen, renders possible a very fine adjustment of the opening.

The incorporation in the organization of the type of valve contemplated by this invention has produced, as shown by extensive use thereof, a hydraulically propelled machine tool free from the defects noted. The speed during the cutting operation can be finely adjusted to the maximum permissible and such speed will be maintained without the frequent adjustment heretofore required thereby resulting in exceptionally high efficiency of production. The sudden spurts resulting from the breaking loose of barriers being eliminated the tool breakage and attendant delays are likewise eliminated. Since the speed of travel can be finely adjusted and maintained, a plurality of independent heads may be more easily maintained in synchronous operation.

These objects and advantages and others as well, resulting from the above broadly noted combination of elements, will be rendered apparent in the following description.

To enable others skilled in the art so fully to apprehended the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a general diagrammatic view of an organization disclosing the general features of this invention. Fig. 2 is a somewhat diagrammatic view of the regulating valve. Fig. 3 is a cross sectional view thereof taken on the line 3—3 of Fig. 2. Fig. 4 is a detached view of the main control valve shown in Fig. 1 but at a different position thereof. Fig. 5 is a view, similar to Fig.

4, showing still another position of the valve. Fig. 6 is a front elevational view of a machine-tool unit showing a practical application of the invention. Fig. 7 is an end view looking from the left in Fig. 6. Fig. 8 is a detail view of the piston supporting means of Fig. 6. Figs. 9 and 10 are cross sectional views of the valve means of Fig. 6. Fig. 11 is a vertical sectional view showing the regulating valve in detail. Fig. 12 is a detail view of the regulating valve plug and Fig. 13 is an end view thereof.

Referring to Fig. 1 for an illustration of the broad features of this invention, an organization of elements is shown in this figure adapted to form the hydraulic actuating means for one or more major working elements of a machine-tool. Reference numerals 11 and 12 indicate hydraulic cylinders having therein the pistons 13 and 14 respectively adapted to actuate the members 15 and 16. The latter members represent any major elements of the machine adapted to be operated during the normal working cycle of the machine and may be tool-carrying heads, as shown herein, or some similar member, such as cross-slides, work-carrying heads, or punch arbors. In the present illustration, the tools carried by the opposed heads 15 and 16 are adapted to simultaneously operate upon a work-piece supported on the machine-tool between the two heads.

The pump 17 serves as a source of hydraulic pressure fluid, taking its supply from the reservoir 18 through the pipe 19, and expelling the liquid through the pipe 20, and branches 21 and 22, to the respective main control valve casings 23 and 24. A relief valve 25 is provided in the supply line 20 and serves to maintain a constant pressure in the line and to form an outlet for the excess fluid supplied. The exhaust is conducted from the control valves through the pipe lines 27 and 28 back to the reservoir 18.

The control valve and valve operating means for each of the hydraulic cylinders are similar, with the exception of being reversed in their positions, and only one of these constructions will, therefore, be described in detail. Reciprocably mounted within the valve casing 23 is a hollow valve member 30, secured to the valve stem 31, which, in turn, is rigid with the slide 32, co-operating with the latch member 33. The latch member 33 is adapted to be operated by the dogs 34 and 35 movable in accordance with the movement of the actuated head. The latch member 33 is normally urged upward by means of the spring 36.

The pipe 37 connects the right end of cylinder 11 with the valve casing 23 through, as diagrammatically shown, the branches 38 and 39, the branch 39 having therein the adjustable regulating valve 40, the function of which is to govern the working stroke, which normally will be of substantially reduced speed. The details of this important feature will be more fully described hereinafter. The left end of the cylinder 11 is connected to the valve casing, through pipe 41.

The normal operation of a machine of the type disclosed consists of a cycle wherein the translatable head 15 receives a rapid forward movement until the tool engages the work. Such movement occurs when the valve is in the position shown in Fig. 1, in which case the oil from the pump flows through the pipe 21, annular groove 42, and pipes 38 and 37 to the right end of cylinder 11. The fluid from the left end of the cylinder exhausts through the pipe 41, passing freely through the valve to the outlet pipe 27, back to the reservoir. The next succeeding event occurs when the dog 34 depresses the latch member 33, permitting the slide 32 to move to the right until the shoulder 43 engages the portion 44 of the latch 33, holding the valve in the position illustrated in Fig. 4. The valve is normally urged to the right by any suitable means, such as a spring or fluid pressure acting on a piston secured thereto; the specific means not being of any concern with respect to the present invention.

In the position of the valve shown in Fig. 4, the branch 38 is closed off and fluid passes to the right end of the cylinder through the regulating valve 40. The left end of the cylinder will still be open to the exhaust. In this position of the valve, the heads proceed on their working stroke until the completion thereof, whereupon the dog, 35 being suitably adjusted in its position on the carrying element, engages the latch 33 to permit the slide 32 and attached valve to move to the position shown in Fig. 5, whereupon the direction of movement of the piston 13 is reversed. In this position of the valve the right end of the cylinder exhausts through the pipe 37 through the hollow interior of the valve and out the pipe 27; fluid being supplied to the left end of the cylinder through the annular groove 42 of the valve member.

The piston and the attached head move on the return stroke to a retracted position where it remains or, by suitable automatic actuation of the valve means, the valve may be caused to assume the position shown in Fig. 1, whereupon a new cycle is begun at once and the operation is automatic and continuous. In the case illustrated in Fig. 1 the head is caused to remain in the retracted position with the valve occupying the position shown in Fig. 5, until a new cycle is initiated when desired by any well known means for resetting the valve member 30 against the impositive means tending to urge it to the right. Such resetting means may consist of a fluid pressure cylinder connected to the valve stem 31 and adapted to have air admitted thereto by manipulation of a hand valve or the valve 30 may be directly moved by manually operated mechanism connected thereto. The above described hydraulic propulsion system may be varied as to details of valves, valve actuation, and arrangement of events forming a complete working cycle without departing from the fundamental conceptions of an organization adapted to carry out this invention.

As has been above described, the oil or other hydraulic fluid is required, during selected appropriate intervals, to pass through the regulating valve 40, causing the tool-head to move forward on its working-stroke. During this period in the organization shown the fluid is required, in order to materially reduce the speed, to pass through a restricted opening. This opening may, in certain cases, be of but very small amount in total cross sectional area. With the employment of certain types of valves serious defects have been observed in the operation of the machine tool. The individual tool-heads were found to jump and advance in an unsteady manner, not at all expected from the well-known characteristics of hydraulic operation. Also, in the case of a machine having a plurality of heads in which it was desired that the heads move in synchronism to arrive simultaneously at the ends of their stroke, the desired harmonious operation could not be obtained even with valves which were adapted to be adjusted to give minute variations in the effective opening. A primary feature of this invention involves the discovery that such defects were due to the shape of the liquid port opening which included a narrowed region. The narrow widths offered a lodging place for grit or other foreign matter which is inevitably present in the oil even when the utmost care is exerted in the prevention and elimination thereof.

Figs. 2 and 3 illustrate somewhat diagrammatically the general features of a valve which it was conceived would eliminate these defects. The design of this valve centers around the idea of providing such an arrangement that for even very small valve openings, the dimensions and relative proportions of the liquid opening would be such that no portion thereof would be narrowed to the extent of offering a lodging place for foreign matter carried by the pressure oil. The valve shown in Figs. 2 and 3, comprises a casing member 46 having slidably mounted therein the valve member 47 adjustable in any convenient manner through the stem 48 attached thereto. The casing is provided with the narrow elongated opening 49 adjacent which moves the slide member 47 having the opening 50 therein. The shoulder portion 51 forms a gate-like member adapted to determine the amount of port opening. Fig. 2 illustrates in relative proportions the size of opening which might, during normal working cycles, be required to give the operative machine member the desired speed. As shown in this figure, the exposed portion 52 is very small in total area but no region thereof is sufficiently reduced in any diametrical dimensions as to permit the collection of grit therein. The exact shape of the valve openings may be varied in any suitable manner, so long as the fundamental requirement is observed; i. e. that the effective opening does not present any narrowed regions. For example, the opening 49 may be considerably wider at the right end thereof and tapered down to a relatively narrow elongated portion at the left. Again the valve may include a rotary plug member instead of a sliding member with the openings so arranged that the effective port opening is determined by the relative angular adjustment of the casing member and plug member.

A complete and practical application of the invention is illustrated in the machine tool shown in Figs. 6 to 13. The main features of this construction include a base or frame 54 adapted to support thereon the machine-tool unit 55 translatable upon the ways 56. Only one unit 55 is shown but in actual practice several of these may be assembled on the main frame including, when desired, units arranged at a vertical angle. Also two or more may be caused to operate in unison as in the case of Fig. 1.

The unit 55 includes a cylinder 57 translatable therewith adapted to receive a piston 58 secured to the piston rod 59, which, in turn, is secured to the fixed head 60. The unit also carries the cluster-plate or head 61 equipped with one or more rotary spindles 62 receiving their rotary motion from the electric motor 63 suitably geared thereto through the head 61.

The piston rod is formed hollow and axially extending therethrough is the pipe 66 adapted to lead oil to the forward end of the cylinder for causing forward motion of the head. The hollow interior of the piston, surrounding the tube 66, provides an oil passage opening through holes 67 into the opposite end of the cylinder. The hydraulic fluid control means include broadly the main control valve 68, the detent means enclosed in the casing 69, and the regulating valve 70 having its casing formed integral or rigid with the main control valve casing 68. The main control valve member 71 is secured to the valve stem 72, which in turn, is secured, at its opposite end, to the stepped slide 73. The latch member 74, normally urged upward by the spring 75, engages the various notches in the underside of the slide 73. Translation of the head 55 causes the adjustable dogs 76, 77, and 78 to engage the plungers 79 or 80 to permit the slide 73 and therefore the valve member 71 to move to the right to govern the successive events in the working cycle. The cylinder 82, having the piston 83 therein secured to the valve rod 72, provides a means of resetting the valve to the position shown in Figs. 6 and 9 for initiating the working cycle. Air under pressure is admitted through the pipe 84 for this purpose, either by a manually operable valve or a valve actuated in accordance with movement of the tool-head; in which case the operation would be automatic and continuous. A spring 85 serves to normally urge the valve to the right, as permitted by the operation of the detent mechanism.

The main control mechanism is shown in cross section in Figs. 9 and 10, such figures being somewhat diagrammatic in order to show the various fluid connections in the plane of the paper. Oil is admitted through pipe 86 from any suitable source, such as that shown in Fig. 1, and is exhausted therefrom back into the reservoir through the pipe 87. The position of the valve shown in Fig. 9 is that for a rapid forward traverse wherein the fluid flows from the pipe 86 through the annular groove 88 and out pipe 89, through the pipe 66, to the forward end of the working cylinder. When the tool approaches the work the dog 77 engages the pin 79 to trip the mechanism, permitting the slide to move to the right until the latch member is engaged by the shoulder 90. This position of the valve is illustrated in Fig. 9, in the dotted line position; in which position the port 91 is closed off and the pressure oil flows through the port 92 through the restricted opening in the regulating valve 93 and continues out pipe 89 to the forward end of the cylinder. During the above two operations, exhaust takes place through the hollow piston rod, pipe 94, and the main valve casing to the return pipe 87.

The next position of the valve is illustrated in Fig. 10 in full lines therein, in which case the valve has been moved to permit fluid to be admitted to the right hand end of the cylinder. Exhaust now takes place from the left end of the cylinder through pipe 89, through the hollow interior of the valve, out ports 96 thereof, and into the return pipe 87. This position of the valve causes the head to be returned to the initial position of rest shown in Fig. 6; the dog 76 serving to trip the detent mechanism, permitting the valve to move to its furthest position to the right shown in dotted lines in Fig. 10, in which position the inlet pipe 86 is blanked off by the piston portion 97 of the valve member.

As stated above, Figs. 9 and 10 are somewhat diagrammatic, the details of the regulating valve of Fig. 6 being more accurately shown in Figs. 11, 12, and 13 and accordingly various elements shown therein are designated by new reference characters. This valve includes the housing member 100 secured to or integral with the main valve casing 68. A bushing 101 is fitted within the bore of the housing portion 100 and has the annular groove 102 in the periphery thereof, which connects through a series of holes 103 with the inner annular groove 104. A threaded nut 105 serves to secure the bushing within the casing opening. A valve plug 106 is rotatably mounted within the bushing and within a cover-plate 107 secured to the housing by means of set screws 108; suitable packing means being provided at 109 to prevent leakage. The valve plug is manually rotated by means of the hand grip 110. A member 112 is secured to the reduced portion 111 of the valve stem and is provided with graduations 113 for indicating the adjustment of the valve. A fluid passage 114 is formed in the main casing to connect the regulating valve with the main pipe-line 89.

The inner end of the valve plug is provided with a bore 115 through one side of which is machined a slot 116 for the discharge of fluid therethrough. The type of valve described above is shown as being a practical form of the type of valve shown in Figs. 2 and 3 and is adapted to perform the function desired in a very efficient manner. The amount of effective opening is determined by the extent to which the elongated opening 116 projects above the shoulder 117; it being obvious that for any substantial flow, the opening presented is of a substantial extent in all diametrical directions. In addition, the threaded shaft provides a very fine adjustment for the valve the relative amount of which can be readily determined by the graduations 113. The valve is well adapted to prevent any leakage, which is an important feature in view of the extreme pressures to which the operating hydraulic fluid is frequently subjected.

The above described construction illustrates one form of the present invention as developed in a machine tool organization. The results are a tool operating in a surprisingly smooth manner under any practical speed or load, and one in which various elements may be synchronized in their movement to a degree closely approaching that of elements positively connected by mechanical gearing.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims;—

Having thus revealed this invention, I claim as new and desire to secure the following combinations and elements, or equivalents thereof, by Letters Patent of United States:—

1. A machine tool combining a frame; a head movably mounted thereon in accordance with a working cycle; a hydraulic motor for operating said head; hydraulic fluid control means to govern the succession of events in the working cycle; a regulating valve connected in said control means; and means for directing the hydraulic fluid through said regulating valve during selected intervals of the cycle to produce a slow working feed, said regulating valve comprising a pair of valve members, a port opening in one of said members having an elongated region, a gate-like closure portion carried by the other member, means for relatively adjusting said members in the general direction of the major axis of said elongated region to expose a variable section thereof to the flow of hydraulic fluid for a slow working feed, and arrangement and shape of the members and exposed opening being such that said exposed opening contains no included angle of substantially less degree than a right angle whereby no region is presented for even a small flow of hydraulic fluid which is sufficiently narrow as to enable the collection therein of any grit or dirt normally entrained by the hydraulic fluid.

2. A machine tool combining a frame; a head movably mounted thereon in accordance with a working cycle; a hydraulic motor for operating said head; control means to govern the succession of events in the working cycle; a regulating valve connected in said control means; and means for directing the liquid through said regulating valve during selected intervals of the cycle to produce a slow working feed, said regulating valve comprising a pair of valve members, a port opening in one of said members having an elongated region, a gate-like closure portion carried by the other member, and means for relatively adjusting said member in the general direction of the major axis of said elongated region to expose a selected transverse section thereof to the flow of liquid, said elongated region being relatively narrow and the sides thereof being substantially parallel whereby there may be obtained a fine adjustment and a relatively small opening for a slow working feed but not being narrow to the extent of permitting the collection therein of any grit or foreign matter normally liable to be entrained by the hydraulic fluid.

3. A machine tool combining a frame; a plurality of heads movable thereon; a hydraulic operating motor for each of said heads; valve means for controlling the flow of fluid to and from said motors to produce a working cycle; an independent adjustable regulating valve for each of said motors; and means for directing the hydraulic operating fluid of each motor through its respective regulating valve during predetermined periods of the cycle for a slow working feed, each of said regulating valves comprising relatively adjustable valve members, a port opening in one of said members having an elongated region, a gate-like closure portion carried by the other member, means for relatively adjusting said members in the general direction of the major axis of said elongated region to expose a selected section thereof to the flow of liquid for a working feed, the arrangement and shape of the members and exposed opening being such that said exposed opening contains no included angle of substantially less degree than a right angle whereby no region is presented for even a small flow of hydraulic fluid which is sufficiently narrow as to enable the collection therein of any grit or dirt normally entrained by the hydraulic fluid.

4. A machine tool combining a frame; a head movably mounted thereon; a hydraulic motor for operating said head; valve means for controlling the flow of fluid to and from said motor to produce a working cycle of said head; an adjustable regulating valve connected in said valve means; and means for directing the operating fluid through said regulating valve for a predetermined period of the cycle to produce a working feed, said regulating valve comprising a member provided with a liquid flow opening having an elongated region, a closure member, means for relatively adjusting said members in the general direction of the major axis of said region to expose a selected section thereof to the flow of hydraulic fluid for a working feed, the width of said region not being less at any point than $\frac{1}{32}$ of an inch and the arrangement and shape of the members and exposed opening being such that said exposed opening contains no included angle of substantially less degree than a right angle whereby no region is presented for even a small flow of hydraulic fluid which is sufficiently narrow as to enable the collection therein of any grit or dirt normally entrained by the hydraulic fluid.

ROBERT M. GALLOWAY.